United States Patent Office 3,388,156
Patented June 11, 1968

3,388,156
METHOD OF RECOVERING CRUDE
TEREPHTHALIC ACID
Ryoichi Sakurai and Shozaburo Nagano, Iwakuni-shi, Japan, assignors to Teijin Limited, Osaka, Japan, a corporation of Japan
No Drawing. Continuation-in-part of application Ser. No. 122,114, July 6, 1961. This application Feb. 24, 1966, Ser. No. 529,644
6 Claims. (Cl. 260—525)

This application is a continuation-in-part of our application Ser. No. 122,114, filed July 6, 1961.

The present invention concerns the purification of a crude terephthalic acid, particularly that prepared by the Henkel rearrangement reaction. More specifically, it relates to a method of recovering substantially pure terephthalic acid which comprises the steps of heating dialkali metal terephthalate in solid form to a temperature of from 100–550° C., dissolving said solid heat-treated dialkali metal terephthalate in water and mixing an active carbon with said dissolved heat-treated dialkali metal terephthalate, removing said active carbon from said solution, reacting the dialkali metal terephthalate solution with an acid having a disassociation constant greater than carbonic acid thereby converting the dialkali metal terephthalate to terephthalic acid; and separating the purified terephthalic acid from solution.

The object of the present invention is to provide a substantially purified terephthalic acid from which a polyethylene terephthalate of excellent whiteness can be prepared even by a direct esterification method as hereinbelow defined.

Heretofore, an ester-interchange between dimethyl terephthalate and ethylene glycol has been mainly employed to manufacture polyethylene terephthalate. However, this is a circuitous method, by which terephthalic acid should be first esterified with methanol to form dimethyl terephthalate, and the resulting dimethyl terephthalate is then subjected to ester-interchange with ethylene glycol. If, therefore, polyesters can be produced directly from terephthalic acid and ethylene glycol, the number of steps can be reduced and it is evidently an advantageous method. (Hereinafter, this method is abbreviated to direct esterification method.)

All the methods of manufacturing polyethylene terephthalate which are now employed for industrial purposes must go through the step of ester-interchange between dimethyl terephthalate and ethylene glycol, and a simple and economical direct esterification between terephthalic acid and ethylene glycol, to which the present invention is directed, is not adopted. The chief reason is that such direct esterification method cannot give such a high purity terephthalic acid as can be used as a starting material for polyesters, in the form of a free acid.

Terephthalic acid holds a unique position among organic compounds, as it neither boils or melts under atmospheric pressure, and it has no good solvents but a few particular types of solvents. It is impossible therefore to purify a crude terephthalic acid in the form of a free acid by using such means generally used for purification of organic compounds as distillation, recrystallization, and zone-melting.

To render polyethylene terephthalate prepared by the use of a direct esterification method commerically valuable, a starting terephthalic acid ought to be purified by some means.

We have found, as a result of our extensive researches into a method of purifying a crude terephthalic acid capable of giving polyethylene terephthalate of excellent whiteness even by direct esterification, that if crude alkali metal terephthalate is heated in solid form to a temperature of 100–550° C., it is possible, by using conventionally known purification means such as active carbon treatment, to completely remove impurities from the crude alkali metal terephthalate, especially such impurities as to cause coloration of polyesters.

Usually a reaction product, an alkali metal salt of terephthalic acid obtained by subjecting alkali salts of aromatic carboxylic acid such as phthalic acid and benzoic acid to a thermal rearrangement reaction at a high temperature in an inert gas (hereinafter the process shall be referred to briefly as Henkel process), contains not only a great quantity of color contaminant, but also finely divided carbonaceous residues formed during the high temperature reaction. Therefore if such a reaction product is subjected merely to active carbon adsorption treatment, a great quantity of active carbon would be necessary to remove the said color contaminant and moreover in filtration, the fine carbonaceous particles cause leakage and thus the purification cannot be accomplished.

It is difficult to decolorize and purify terephthalic acids prepared by the oxidation of p-dialkyl benzene such as paraxylene or 1,2-(p,p'-dialkyl diphenyl)ethane, because of the containing of various coloured components and intermediate oxides. Even if a great quantity of active carbon is used, in negligence of its cost, to decolorize an alkali metal salt of a crude terephthalic acid prepared by reaction of it with an aqueous solution of caustic potash or caustic soda, the terephthalic acid again develops remarkable colour during the direct esterification reaction.

In accordance with the present invention, if an alkali metal salt of terephthalic acid is heated to a temperature not higher than 550° C., even in the presence of some air, it is possible to reduce the loss of the alkali metal terephthalate to 1–2% and to decompose and remove thermally-instable impurities almost quantitatively.

The optimum temperature in the heat-treatment of the present applicaion, although differing depending upon the types of additive and atmospheric gas, is as high as above 400° C. in an inert gas such as carbon dioxide, nitrogen and hydrogen, and above 300° C. in vapour, ammonia and carbon monoxide, both in the absence of an additive. It was found that in an oxidative atmosphere such as air, good results can be obtained by heating to a temperature above 300° C. even without an additive. If the heat-treatment is carried out in an atmosphere of gaseous mixture, especially an atmosphere of a mixture of vapour with a small amount of air, very favourable results are obtained because the heat-treatment effect is supplemented by an oxidation effect.

When in the said heat-treatment, such an additive as metal salt or ammonium salt of nitric acid, sulphuric acid or chromic acid and ammonium chloride is incorporated, sufficient results can be obtained at a lower heat-treatment temperature, and even at 150° C. in an atmosphere of air.

If an organic acid, an organic acid salt, quinone, aldehyde or amine is used together with the above-mentioned additive, more favourable results can be obtained. Such organic substance may be added singly.

Of course, a lower temperature prolongs the heat-treatment and at higher temperature, a short period of heat-treatment gives good results. When the heat-treatment temperature is low and the heat-treatment time is short, the decolorization effect is low. On the other hand, when a heat-treatment temperature is high and the time for heat-treatment is long, the yield of terephthalic acid is lowered. Good results are observed even if the additive is incorporated in an amount of 0.1% of the alkali metal terephthalate. Although there is no harm in adding more than 20% of the additive, it is usually appropriate to use it in an amount of about 1–10%. It is necessary to choose such reaction conditions as will bring about good decolorization effect and cause little decrease in the yield of terephthalic acid, by taking into consideration the above-mentioned conditions.

As a method similar to this heat-treatment method, there was proposed a method by which terephthalic acid prepared by the oxidation of p-xylene is heated in the form of a free acid to a temperature above 350° C., and meanwhile the impurities are removed partly by sublimation and partly by decomposition. In such a method, however, it is known that the sublimation and heat-decomposition of terephthalic acid take place simultaneously and the loss of the terephthalic acid is very great. It is clear therefore that the purification method of the present application is industrially more advantageous, which makes it possible to decompose and remove the impurities more effectively and without loss of terephthalic acid even if heat-treatment is carried out under more severe conditions.

In accordance with the present invention, alkali metal salt such as potassium and sodium salt of a crude terephthalic acid which has been heat-treated in solid form is then put into water to make its aqueous solution. Here the metallic component contained in the crude alkali metal terephthalate (which consists mainly of a catalyst residue) and carbonaceous residues are present in the water as insolubles.

In the present invention, an active carbon is added to the said aqueous solution of alkali metal terephthalate after separating the said insoluble residues or directly without separating, and mixed while stirring to separate the active carbon. For the separation of the active carbon, any conventional means such as filtration and centrifuge can be used. If at this time an active carbon is directly added to terephthalic acid containing an insoluble residue is separated simultaneously with the separation of the active carbon. When an active carbon is added to an aqueous solution of alkali metal terephthalate after separation of the said insoluble residue, mainly active carbon is separated. As the coloured impurities contained in a crude alkali metal terephthalate are converted by the heat-treatment of the present invention into form capable of being adsorbed by an active carbon, they are substantially completely separated and removed from the aqueous solution of alkali metal terephthalate together with the active carbon.

In accordance with the present invention, therefore, a highly pure terephthalic acid substantially free from coloured impurities can be prepared by adding an acid or its aqueous solution to an aqueous solution of alkali metal terephthalate substantially free from the said coloured impurities to precipitate terephthalic acid and recovering it. As the acid used in this process, any acid having a disassociation constant greater than carbonic acid, such as mineral acids, organic acids, and sulphurous acid, can be used. But preferably the acid should be such as to give rise to the recovery of alkali in a form suitable for re-use. The disassociation constant of carbonic acid is $4.57 \times 10^{-7}$, and in accordance with the present invention carbonic acid itself and acids having a greater disassociation constant are used. Some examples of the acid usable in the present invention are shown along with their disassociation constant.

Acid: Disassociation constant
Sulphuric acid ($H_2SO_4$) _____ ca. 1
Hydrochloric acid (HCl) _____ ca. 1
Oxalic acid [$(COOH)_2$] _____ $5.90 \times 10^{-2}$
Acetic acid ($CH_3COOH$) _____ $1.75 \times 10^{-5}$
Benzoic acid [1] _____ $6.31 \times 10^{-5}$

[1] 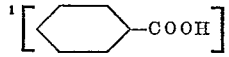

Phthalic acid [2] _____ $1.0 \times 10^{-3}$

[2] 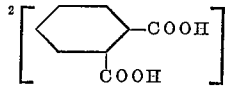

Thus, in accordance with the present invention, the speed of filtration of a crude terephthalic acid is remarkably increased and it is possible to obtain a highly purified terephthalic acid from which polyesters of sufficiently high whiteness can be manufactured even by direct esterification. The invention is further illustrated below with reference to examples which in no way limit the present invention.

Example 1

(1) To dipotassium phthalate was added 3 mol percent of cadmium chloride and the mixture was subjected to the thermal rearrangement reaction at 450° C. under the gauge pressure of 5 kg./cm.² The obtained reaction product was subjected to a heat treatment under the various conditions of which gas atmospheres, reaction temperatures and periods were shown in the first, second, and third columns of the following Table 1 respectively. Each treated product was dissolved in water and the insoluble carbonaceous residues and catalyst were filtered. The periods required for the filtration were measured and shown in the fourth column of said table. To this filtrate was added an active carbon in the amount of 2% based on the reaction product, the mixture was decolorized at the boiling point of the solution for 30 minutes, thereafter said active carbon was filtered off at a high temperature. The decolorized solution thus obtained was acidified with a 10% aqueous solution of hydrochloric acid, the terephthalic acid formed was filtered and washed sufficiently with cold water.

The yield of the terephthalic acid and the optical density of the ammonium solution and of the concentrated sulfuric acid solution were measured and are shown in Table 1.

For the purpose of comparison, the thermal rearrangement reaction product was dissolved in water without being subjected to a heat treatment and the insoluble were filtered. The filtrate was similarly decolorized and acidified with an aqueous solution of hydrochloric acid. The optical density respectively of the ammonium solution and of the concentrated sulfuric acid solution of the obtained terephthalic acid was infinite. Results are also shown in Table 1.

TABLE I

| Run No. | Kind of gas | Temperature of heat treatment, °C. | Period required for heat treatment, hour | Period required for filtration, min. | Yield of terephthalic acid, percent | Optical density of ammonium solution [1] | Optical density of concentrated sulfuric acid [2] | Appearance |
|---|---|---|---|---|---|---|---|---|
| 1-a | Carbon dioxide | 500 | ½ | 21 | 97.7 | 0.090 | 0.751 | White. |
| 1-b | Steam | 450 | 2 | 21 | 97.8 | 0.093 | 0.732 | Do. |
| 1-c | Air | 400 | ½ | 9 | 98.9 | 0.071 | 0.515 | Do. |
| 1-d | Steam and air 1:3 (volume ratio) | 450 | ½ | 13 | 98.7 | 0.045 | 0.349 | Do. |
| 1-e (control) | Non heat-treatment | | | 175 | 100 | ∞ | ∞ | Red brown. |

[1] The optical density of the ammonium solution is a value measured, in accordance with the method shown in British Patent No. 795,909, with respect to a solution of terephthalic acid in aqueou ammonia at 380 mμ using a cell with a length of 4 cm.

[2] The optical density of the conc. sulphuric acid is a value measured with respect to a solution of terephthalic acid in a conc. sulphuric acid which has been heated for a specified time at 380 mμ using a cell 4 cm. long.

The above table demonstrates that when a heat treatment was carried out in accordance with this invention, not only the decolorization effect but also the rate of the filtration were remarkably improved.

(2) To the many samples of the same reaction product obtained by the thermal rearrangement of a dipotassium phthalate same as the above (1) were added the additives described in the first column of Table 3 below whose amounts are described in the second column of said table and the mixtures were subjected to a heat treatment in the air for 30 minutes respectively at temperatures described in the third column of said table. The heat-treated products were dissolved in water to remove the insoluble same as above (1) and were decolorized by an active carbon in the amount of 2% based on the reaction products; thereafter, said reaction products were acidified with an aqueous solution of hydrochloric acid, the degree of the coloration of the obtained terephthalic acid was measured. The results were shown in the fourth and the fifth columns of Table 2.

the same method as in the foregoing (1), each heat treated mixture was dissolved in water and the same was decolorized with an active carbon in the amount of 2% based on the disodium salt, each of the decolorized solution was acidified with an aqueous solution of hydrochloric acid and the purified terephthalic acid was obtained.

Aside from this, the alkali metal salt was made into the aqueous solution thereof without being subjected to the heat treatment, decolorized by an active carbon of the same amount with above, acidified with an aqueous solution of hydrochloric acid and the obtained terephthalic acid was made a control sample.

When the optical density of the ammonium solution and the concentrated sulfuric acid solution of those terephthalic acid was measured respectively, the results were obtained as shown in the sixth and the seventh columns of Table 3 below.

The yields of terephthalic acids were almost theoretical.

TABLE 2

| Run No. | Heat treatment conditions | | | Optical density of ammonium solution | Optical density of concentrated sulfuric solution acid | Appearance |
|---|---|---|---|---|---|---|
| | Additive | | Heat treatment temperature, °C. | | | |
| | Name | Amount, percent | | | | |
| 2-1 | $NH_4Cl$ | 3 | 150 | 0.090 | 0.658 | White. |
| 2-2 | $NH_4Cl$ | 3 | 350 | 0.038 | 0.283 | Do. |
| 2-3 | $K_2CrO_4$ | 8 | 350 | 0.041 | 0.342 | Do. |
| 2-4 | $NH_4NO_3$ | 3 | 350 | 0.045 | 0.355 | Do. |
| 2-5 | $NH_4NO_3$ | 3 | 400 | 0.063 | 0.450 | Do. |
| 2-6 | $MgHO_3 \cdot 3H_2O$ | 3 | 400 | 0.052 | 0.370 | Do. |
| 2-7 | $Pb(NO_3)_2$ | 3 | 400 | 0.057 | 0.413 | Do. |

TABLE 3

| Run No. | Classification of manufacturing method of terephthalic acid | Additive | Period of heat treatment | Temperature of heat treatment, °C. | Optical density of ammonium solution | Optical density of concentrated sulfuric acid solution | Appearance |
|---|---|---|---|---|---|---|---|
| 3-1 (control) | Nitric acid oxidation of p-xylene | None | Non-heat-treated | | 0.720 | | Yellow. |
| 3-2 | | None | ½ hour | 400 | 0.180 | 0.648 | Light yellow. |
| 3-3 | | $NH_4Cl$, 3% | do | 350 | 0.038 | 0.133 | White. |
| 3-4 (control) | Air oxidation of p-xylene | None | Non-heat-treated | | 0.162 | | Light yellow. |
| 3-5 | | None | ½ hour | 400 | 0.073 | 0.260 | Slightly yellow. |
| 3-6 | | $NH_4Cl$, 3% | do | 350 | 0.012 | 0.080 | White. |
| 3-7 | | $K_2SO_4$, 3% | do | 350 | 0.015 | 0.068 | Do. |
| 3-8 (control) | Air oxidation of p-diisopropyl benzene | None | Non-heat-treated | | 0.044 | 1.022 | Slightly yellow. |
| 3-9 | | $NH_4Cl$, 3% | ½ hour | 350 | 0.015 | 0.084 | White. |

In each case, pure-white terephthalic acid as obtained and the yield thereof was almost 100% so long as the heat treating temperature was below 400° C. For remarks, the water soluble ones of the above-mentioned additives were used in the forms of the aqueous solution thereof, in this case the reaction products were wetted with said solution and dried, thereafter subjected to the heat treatment. While the water insoluble ones of said additives were directly added to the reaction products and uniformly mixed with each other and thereafter subjected to a heat treatment. Of course, however, the water soluble additives can also be directly added to the reaction products.

(3) This example illustrates a heat treatment of the crude disodium salt of terephthalic acid which is obtained by the air-oxidation of p-xylene or p-diisopropyl benzene in acetic acid or by the oxidation thereof with nitric acid.

The above crude terephthalic acid was dissolved in an aqueous solution containing nearly the equivalent amount of caustic soda and after water was evaporated a crude disodium terephthalate was obtained.

The types of methods used for preparing terephthalic acid were shown in the second column of Table 3 below. To the crude disodium terephthalate were added additives in the amount of 3% based on said terephthalate as shown in the third column of said table and the mixtures were subjected to the heat treatment under conditions as shown in the fourth and fifth columns of said table. By As is seen from above table, it can be generally said that terephthalic acid obtained by the nitric acid oxidation or the air oxidation has a comparatively low optical density of the ammonium solution. However, said terephthalic acid without being subjected to the heat treatment according to this invention has an extremely high optical density of the concentrated sulfuric acid solution. However, when said terephthalic acid was subjected to the heat treatment in accordance with this invention, the purified terephthalic acid can be obtained, the OD ($H_2SO_4$) thereof being extremely low.

This example shows the influence of a temperature in the heat treatment of the reaction product obtained by the thermal rearrangement of dipotassium phthalate on the OD ($H_2SO_4$) of the treated product.

To dipotassium phthalate was added 2 mol percent of cadmium phthalate, the mixture was subjected to the thermal rearrangement reaction at 420° C. under 5 atmospheres (gauge) for 2 hours, and reaction product whose principal component is terephthalate was obtained.

To said reaction product were added same as in the foregoing (2) additives as shown in the second column of Table 4 below and the mixture was subjected to the heat treatment at temperatures as shown in the third column of said table for 30 minutes under the air atmosphere. The resulting mixtures were further subjected to the same after-treatment as in said (1).

TABLE 4

| Run No. | Additive | Temperature, °C. | Optical density of ammonium solution | Optical density of concentrated sulfuric acid solution | Appearance |
| --- | --- | --- | --- | --- | --- |
| 4-1 (control) | Non-heat-treated | | 2.75 | ∞ | Red pink. |
| 4-2 | None | 200 | 1.030 | ∞ | Pink. |
| 4-3 | do | 300 | 0.120 | 0.860 | Slightly pink. |
| 4-4 | do | 400 | 0.054 | 0.375 | White. |
| 4-5 | do | 480 | 0.042 | 0.295 | Do. |
| 4-6 | $NH_4Cl$, 3% | 100 | 0.150 | 1.150 | Light pink. |
| 4-7 | $NH_4Cl$, 3% | 150 | 0.087 | 0.642 | Slightly pink. |
| 4-8 | $NH_4Cl$, 3% | 200 | 0.058 | 0.415 | White. |
| 4-9 | $NH_4Cl$, 3% | 300 | 0.039 | 0.281 | Do. |
| 4-10 | $NH_4Cl$, 3% | 400 | 0.032 | 0.230 | Do. |
| 4-11 | $NH_4Cl$, 3% | 480 | 0.032 | 0.225 | Do. |

From above table, it is observed that even when no additive was used, a satisfactory effect was achieved when a temperature was above 300° C., and when an additive was added, a satisfactory effect was achieved even at a temperature of 150° C. The yield of terephthalic acid was almost theoretical at a temperature below 400° C. and was 98–99% at a temperature of above 400° C.

Example 2

This example illustrates a comparison among the heat-treatment in a solution form, the absence of heat-treatment, and the heat-treatment in accordance with the present invention.

A mixture consisting of 121.0 kg. of dipotassium phthalate, 4.14 kg. of cadmium phthalate, 2.76 kg. of potassium carbonate and 1.49 kg. of potassium chloride was fed into an anti-pressure reaction vessel and subjected to rearrangement reaction under heating for 30 minutes at 440° C. under a carbon dioxide gauge pressure of 5 kg./cm.$^2$. There was produced 123.0 kg. of a rearrangement reaction product whose main component is dipotassium terephthalate.

Run A: Eighty litres of water was added to 23 kg. of the rearrangement reaction product and boiled under reflux for 30 minutes with a reflux condenser provided. After suction-filtration of the insolubles, 0.345 kg. of a powdery active carbon was added to the filtrate and the mixture was stirred for 30 minutes at 40–50° C. and decolorized, followed by the filtering off of the active carbon. The obtained decolorized liquor was heated at about 90° C., and a diluted hydrochloric acid (1:1) was added until the pH of the liquor reached 2.0. The liquor was weakly boiled for 30 minutes, and the precipitated terepthalic acid was suction filtered, and washed with about 50 litres of water. The obtained cake was dried to get 13.8 kg. of terephthalic acid.

Run B: One hundred and twenty liters of water was added to 34.5 kg. of a rearrangement reaction product. After the filtering off of the insolubles as in Run A, the mixture was decolorized with the use of 0.520 kg. of a powdery active carbon and 149 kg. of the decolorized liquor was obtained. The whole of the decolorized liquor was put in a concentrator equipped with a condenser, and concentrated until 97 litres of water was distilled out. The precipitated dipotassium terephthalate was filtered by a centrifuge and washed with 1 litre of water. Eighty litres of water was added to the obtained cake, and dissolution was effected under heating. After precipitation by acid, filtration, washing and drying as in Run A, 14.3 kg. of terephthalic acid was obtained.

Run C: Twenty-three kg. of a rearrangement reaction product (powder containing masses) was put in a reactor and after the atmosphere was replaced by carbon dioxide, it was heated to 450° C. and at this temperature treated for 30 minutes. The product was treated by the same procedures as in Run A and there was obtained 13.5 kg. of terephthalic acid.

Run D: To 23 kg. of a rearrangement reaction product was added 0.69 kg. of $NH_4Cl$. They were pulverized and mixed for 1 hour in a ball mill. The resulting 23.2 kg. of a powdery mixture was put in a reactor, and after the atmosphere was replaced by carbon dioxide, it was heat-treated at 400° C. for 30 minutes. The same treatment of this product gave 13.4 kg. of terephthalic acid.

The optical density of an aqueous ammonia solution and that of a conc. sulphuric acid solution, both of the terephthalic acid obtained, are measured and shown in Table 5. (Twenty ml. of concentrated sulphuric acid were added to 1 g. of terephthalic acid and the mixture was heated at 150° C. for one hour to make a solution. The optical density of this solution at 380 mµ was measured using a 1 cm.-long cell with the similarly heat-treated conc. sulphuric acid used as reference.)

Further, the test of polymerization of each terephthalic acid was conducted in the following manner.

An anti-pressure reaction vessel equipped with a stirrer and a distillation column was charged with 10 kg. of terephthalic acid, 6.7 kg. of ethylene glycol and 6.14 g. of dihydrate of lithium acetate, and the mixture was esterified at 230° C. at a gauge pressure of 2.5 kg./cm.$^2$. When the conversion ratio calculated from the amount of water distilled out reached 65%, the pressure was gradually reduced for a period of 40 minutes to atmospheric pressure and the reaction was terminated. The total reaction time was about 6 hours in each case. After the reaction, 2.58 g. of cobalt chloride hexahydrate, 4.9 g. of trimethyl phosphate, 4.22 g. of antimony oxide and 57.8 g. of titanium dioxide were added to the reaction product. The mixture was then transferred to a polymerization vessel and during reaction at atmospheric pressure for 15 minutes and at a weak vacuum for 45 minutes, the internal temperature was raised from 230° C. to 280° C. Thereafter the reaction was carried out at 0.3 mm. Hg until the intrinsic viscosity of the reaction product measured in O-chlorophenol at 35° C. reached 0.62.

The polymer was extruded in ribbon-like form, cooled

TABLE 5

| Run No. | Purification method | Shades of $K_2TA$ solution before acid precipitation | | Shades of purified terephthalic acid | | | Shades of polyesters prepared | | | |
| --- | --- | --- | --- | --- | --- | --- | --- | --- | --- | --- |
| | | Optical density [1] | Coloured | $NH_4OH$ optical density | $H_2SO_4$ optical density | Appearance | L | a | b | Appearance |
| A | Decolorization of active carbon | 7.2 | Red brown; transparent. | 1.33 | 3.62 | Pink | (²) | (²) | (²) | |
| B | Decolorization of active carbon—crystallizing out by concentration. | 1.49 | Light red brown; transparent. | 0.180 | 1.11 | Light pink | 66.9 | −3.0 | 13.3 | Yellow brown. |
| C | Heat-treatment without additive—decolorization by active carbon. | 0.222 | Light pink; transparent. | 0.053 | 0.278 | White | 75.1 | −4.1 | 7.9 | White (slightly yellowish). |
| D | Heat-treatment with use of additive—decolorizing by active carbon. | 0.050 | Water-white; transparent. | 0.021 | 0.188 | do | 78.2 | −3.6 | 4.2 | White. |

[1] Measured with respect to a 20 wt. percent solution of dipotassium terephthalate at 380 mµ using a 1 cu.-long cell and with water used as reference.
[2] Polymerization impossible.

and cut into chips, whose colour shades were measured in accordance with Hunter's chromaticity diagram. In the Hunter's diagram, L shows a brightness which varies from 0 (black) to 100 (white); $a$ is a parameter showing red (+) to green (—); and $b$ shows yellow (+) to blue (—).

It can be understood from the above that the purification method of the present invention by heat-treatment brings about an excellently purified terephthalic acid which cannot be obtained by the conventional technique such as crystallization by concentration. It is thus possible to prepare polyethylene terephthalate of excellent quality even by direct esterfication of the thus purified terephthalic acid and ethylene glycol.

Example 3

This example shows examples of a variety of acids used for the precipitation of tetrephalic acid from an aqueous solution of alkali metal terephthalate.

The rearrangement reaction product described in Example 2 (2.0 kg.) was mixed with 60 g. of $NH_4Cl$ in a mortar. The mixture was put in an autoclave and heated to 400° C. for thirty minutes. Seven litres of water was added to the product, heated, and boiled weakly for 30 minutes. Fifty grams of a powdery active carbon was further added and stirring was carried out for 30 minutes. The insolubles such as the carbonaceous material, the catalyst and the active carbon were removed by suction filtration, and 6.8 litres of a decolorized liquor was obtained.

Run A: One litre of the decolorized liquor was heated and when the temperature rose to about 90° C., a diluted aqueous solution of hydrochloric acid (1:1) was added while stirring until the pH of the liquor reached 2.0. With the provision of a reflux condenser, the liquor was boiled under reflux for 30 minutes and the precipitated terephthalic acid was suction filtered. The obtained cake was admixed with 1.5 litres of water and boiled under reflux for 30 minutes. Again suction filtration was carried out, and the cake was washed with 500 ml. of water and dried overnight in a drier at 100° C. There was obtained 176.2 g. of a pure white terephthalic acid. The optical density of a solution of this terephthalic acid in ammonia was 0.023.

Run B: One litre of the decolorized liquor was taken out, and the procedures of Run A were repeated except that a diluted aqueous solution of hydrochloric acid (1:2) was used. The obtained terephthalic acid was pure white and the yield was 176.4 g. The ratio of recovery was 100%. The optical density of an aqueous ammonia solution of this terephthalic acid was 0.026.

Run C: Carbon dioxide was blown into one litre of the decolorized liquor for 2 hours at room temperature. The white precipitate was suction filtered and the obtained cake was washed with about 100 ml. of ice water. One liter of water was added to the cake, and heated to 90° C., followed by addition of 148 g. of phthalic anhydride. With the provision of a reflux condenser, the mixture was boiled under reflux and hot suction filtered. The cake was immediately washed with 200 ml. of hot water and dried to form 125.6 g. of a pure white terephthalic acid. The ratio of recovery was 71.2%. The optical density of an aqueous ammonia solution of terephthalic acid was 0.019.

The above filtrate and water which has been used to wash the cake were collected and hydrochloride acid was added to the collected liquor under heating whereby 50.5 g. of the precipitated white terephthalic acid was recovered.

Run D: One liter of the decolorized liquor was heated to 90° C. Separately, 230 g. of hydrogen potassium phthalate was dissolved in 1 liter of water under heating. The resulting solution was gradually added to the heated decolorized liquor. For 30 minutes after the addition, the mixture was stirred at 90° C., and left to be cooled to room temperature while stirring. The precipitate was suction filtered and the cake was washed with 100 ml. of ice water. The filtrate was dipotassium phthalate containing a small quantity of hydrogen potassium terephthalate and hydrogen potassium phthalate.

One liter of water was added to the cake and was heated to 90° C., followed by the addition of 160 g. of powdery phthalic anhydride. With the provision of reflux condenser, the mixture was boiled for one hour under reflux, and hot suction filtered. The cake was instantly washed with 200 ml. of a hot water. The cake was admixed with 1 liter of water and stirred for 30 minutes at about 90° C., followed again by suction filtration. The obtained cake was dried overnight at 100° C. and 173.5 g. of a pure white terephthalic acid was obtained. The ratio of recovery was 98.4%. The optical density of a solution of the terephthalic acid in ammonia was 0.017.

Run E: One liter of the decolorized liquor was diluted with one liter of water and the diluted liquor was heated to 90° C. While stirring, acetic acid was gradually added until the pH value reached 2.2 With the provision of a reflux condenser, the mixture was boiled for 30 minutes under reflux, and hot suction filtered. On addition of 1 liter of water, the cake was again boiled under reflux for 30 minutes, suction filtered, washed with 500 ml. of a hot water, and dried overnight at 100° C. There was obtained 174.0 g. of a pure white terephthalic acid. The optical density of a solution of this terephthalic acid in ammonia was 0.022.

As can be understood from the foregoing Runs A through E, there is no essential difference among the methods of precipitating terephthalic acid, and any acid having an acidity greater than that of terephthalic acid can be used.

We claim:

1. A method of recovering substantially pure terephthalic acid which comprises the steps of heating dialkali metal terephthalate in solid form to a temperature of from 100–550° C., dissolving said solid heat-treated dialkali metal terephthalate in water and mixing an active carbon with said dissolved heat-treated dialkali metal terephthalate, removing said active carbon from said solution, reacting the dialkali metal terephthalate solution with an acid having a disassociation constant greater than carbonic acid thereby converting the dialkali metal terephthalate to terephthalic acid; and separating the purified terephthalic acid from solution.

2. A method according to claim 1 wherein the purified terephthalic acid is further washed with water.

3. A method according to claim 1 wherein the solid dialkali metal terephthalate is obtained by the Henkel rearrangement reaction.

4. A method of recovering substantially pure terephthalic acid according to claim 1 wherein after dissolving the heat-treated dialkali metal terephthalate in water, insoluble impurities contained in the dialkali metal terephthalate are removed and thereafter the active carbon is added to the obtained solution.

5. A method of recovering substantially pure terephthalic acid which comprises the steps of heating dialkali metal terephthalate in solid form to a temperature of from 100–550° C., said heating being carried out in the presence of a compound selected from the group consisting of ammonium salts and metallic salts of nitric acid, ammonium salts and metallic salts of chromic acid, ammonium salts and metallic salts of sulphurous acid and ammonium salts of hydrochloric acid.

6. A method according to claim 5 wherein the compound is present in an amount of from 0.1% to 20% by weight of the dialkali metal terephthalate.

References Cited

UNITED STATES PATENTS 1,892,396 12/1932 Jaeger _____ 260—525 X
2,866,815 12/1958 Schirp _____ 260—525 X HENRY R. JILES, *Primary Examiner.*

S. B. WILLIAMS, *Assistant Examiner.*